(12) United States Patent
Yousif et al.

(10) Patent No.: US 10,847,038 B2
(45) Date of Patent: Nov. 24, 2020

(54) AIRCRAFT COMMUNICATIONS SYSTEM WITH AN OPERATIONAL DIGITAL TWIN

(71) Applicant: The Boeing Company, Chicago, IL (US)

(72) Inventors: Aziz Yousif, Everett, WA (US); Arun Ayyagari, Seattle, WA (US); David T. Kirkland, Normandy Park, WA (US); Ethan Carl Owyang, Bothell, WA (US); Jason Apanovitch, Marysville, WA (US); Timothy William Anstey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/100,985

(22) Filed: Aug. 10, 2018

(65) Prior Publication Data
US 2020/0051440 A1  Feb. 13, 2020

(51) Int. Cl.
| | |
|---|---|
| *H04W 4/44* | (2018.01) |
| *G08G 5/00* | (2006.01) |
| *G07C 5/00* | (2006.01) |
| *H04L 29/06* | (2006.01) |

(52) U.S. Cl.
CPC .......... *G08G 5/0013* (2013.01); *G07C 5/008* (2013.01); *H04L 65/80* (2013.01); *H04W 4/44* (2018.02)

(58) Field of Classification Search
USPC ........................................................ 701/120
See application file for complete search history.

(56) References Cited

U.S. PATENT DOCUMENTS

| | | | | |
|---|---|---|---|---|
| 2018/0096608 | A1* | 4/2018 | Westervelt | G05D 1/0005 |
| 2018/0257683 | A1* | 9/2018 | Govindappa | B61L 27/0077 |
| 2018/0322699 | A1* | 11/2018 | Gray | G06T 19/003 |
| 2019/0138333 | A1* | 5/2019 | Deutsch | G06F 9/45516 |
| 2019/0138662 | A1* | 5/2019 | Deutsch | G06F 17/50 |
| 2019/0164433 | A1* | 5/2019 | MacDowell | G08G 5/003 |
| 2019/0266295 | A1* | 8/2019 | Masuda | G07C 5/008 |
| 2019/0287079 | A1* | 9/2019 | Shiraishi | G06Q 10/20 |
| 2019/0382003 | A1* | 12/2019 | Jiang | H04W 84/00 |

* cited by examiner

Primary Examiner — James M McPherson
(74) Attorney, Agent, or Firm — Yee & Associates, P.C.

(57) ABSTRACT

A method, apparatus, and system for facilitating communications between a client computer system and a vehicle computer system in a vehicle. An operational digital twin establishes communications with the client computer system using a client interface and the vehicle computer system using a vehicle interface. The operational digital twin includes a model of the vehicle computer system. Remote information received from the vehicle computer system is stored. The stored information is sent responsive to a request received from the client computer system. The remote information responsive to request but absent from the stored information is retrieved from the vehicle computer system. The retrieved information is sent to the client computer system, wherein the operational digital twin operates to provide network connectivity between the vehicle computer system in the vehicle and the client computer system with an increased a quality of service to the client computer system.

20 Claims, 7 Drawing Sheets

AIRCRAFT COMMUNICATIONS SYSTEM WITH AN OPERATIONAL DIGITAL TWIN

BACKGROUND INFORMATION

1. Field

The present disclosure relates generally to an improved aircraft communications system and, in particular, to a method, apparatus, and system for facilitating communications between an aircraft and a remote client.

2. Background

Communications aircraft and ground locations communicate with each other to facilitate the operation and maintenance of aircraft. The ground locations are for entities, such as airlines, maintenance facilities, and other entities. These entities use the information for a number of different purposes.

For example, an airline may obtain fuel use logs from its fleet of commercial airplanes to project fuel use and costs to operate the commercial airplanes. Fuel use information can be used to calculate fuel efficiency and project fuel costs for airlines. Logs of data from these airplanes also provide information for identifying maintenance and scheduling maintenance for the commercial airplanes.

Currently, a maintenance operator enters the aircraft between flights with a laptop to download logs and other information from computer systems in the aircraft. This process is time-consuming and cumbersome.

Therefore, it would be desirable to have a method and apparatus that take into account at least some of the issues discussed above, as well as other possible issues. For example, it would be desirable to have a method and apparatus that overcome a technical problem with transferring information from an aircraft to a client computer system with a desired quality of service.

SUMMARY

In an embodiment of the present disclosure, an aircraft communications system is present for communicating with an aircraft. The aircraft communications system comprises a computer system and an operational digital twin for the aircraft. The operational digital twin runs on the computer system and models an aircraft computer system in the aircraft. The operational digital twin has an aircraft interface configured to communicate with the aircraft computer system and a client interface configured to communicate with a client computer system in a location remote to the aircraft. The operational digital twin establishes communications with the aircraft computer system in response to the aircraft computer system initiating the communications. The operational digital twin stores remote information received from the aircraft computer system using the aircraft interface to form stored information and sends the stored information responsive to a request received from the client computer system using the client interface. The operational digital twin retrieves the remote information responsive to request but absent from the stored information from the aircraft computer system using the aircraft interface to form retrieved information. The operational digital twin sends the retrieved information to the client computer system using the client interface, wherein the operational digital twin operates to provide network connectivity between the aircraft computer system in the aircraft and the client computer system with an increased a quality of service to the client computer system.

In another embodiment of the present disclosure a vehicle communications system communicates with a vehicle. The vehicle communications system comprises a computer system and an operational digital twin for the vehicle. The operational digital twin runs on the computer system and models a vehicle computer system in the vehicle. The operational digital twin has a vehicle interface configured to communicate with the vehicle computer system and a client interface configured to communicate with a client computer system in a location remote to the vehicle. The operational digital twin stores remote information received from the vehicle computer system using the vehicle interface to form stored information and sends the stored information responsive to a request received from the client computer system using the client interface. The operational digital twin retrieves the remote information responsive to request but absent from the stored information from the vehicle computer system using the vehicle interface to form retrieved information. The operational digital twin sends the retrieved information to the client computer system using the client interface, wherein the operational digital twin operates to provide network connectivity between the vehicle computer system in the vehicle and the client computer system with an increased a quality of service to the client computer system.

In yet another embodiment of the present disclosure, a method for facilitating communications between a client computer system and a vehicle computer system in a vehicle. An operational digital twin running on a computer system establishes communications with the client computer system using a client interface in the operational digital twin and the vehicle computer system in the vehicle using a vehicle interface. The operational digital twin includes a model of the vehicle computer system. Remote information received from the vehicle computer system using the vehicle interface is stored to form stored information. The stored information is sent responsive to a request received from the client computer system using the client interface. The remote information responsive to request but absent from the stored information is retrieved from the vehicle computer system using the vehicle interface to form retrieved information. The retrieved information is sent to the client computer system using the client interface, wherein the operational digital twin operates to provide network connectivity between the vehicle computer system in the vehicle and the client computer system with an increased a quality of service to the client computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
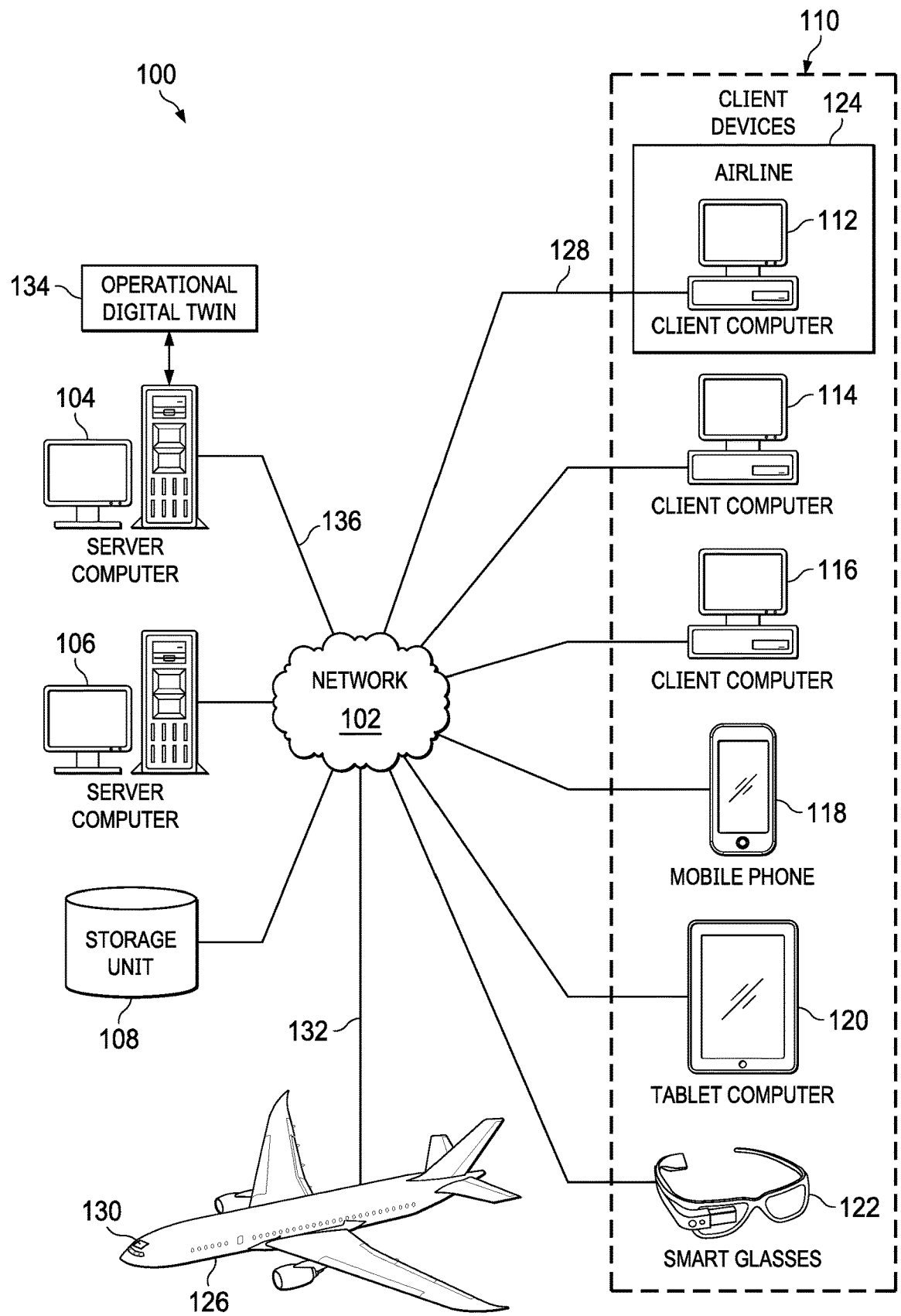
FIG. 1 is an illustration of a pictorial representation of a network of data processing systems in which illustrative embodiments may be implemented.

With reference now to the figures and, in particular, with reference to FIG. 1, an illustration of a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide connections between various devices and computers connected together within network data processing system 100. Network 102 may include connections, such as wire, wireless communication connections, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections. These connections enable the establishment of communications links to transfer information.

Program code located in network data processing system 100 may be stored on a computer-recordable storage medium and downloaded to a data processing system or other device for use. For example, program code may be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols as well as other protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, airline 124 communicates with commercial airplane 126 via client computer 112 connected to network 102 via connection 128. Computer system 130 in commercial airplane 126 can communicate with client computer 112 at airline 124 via connection 132 to network 102.

As depicted, connection 132 for commercial airplane 126 may vary in bandwidth during over time. For example, during flight, connection 132 for commercial airplane 126 is much more limited than connection 128 for client computer 112. Further, the latency, loss, and jitter in connection 132 is greater than connection 128.

In this illustrative example, connection 132 for commercial airplane 126 may use a satellite data link or a wireless radio frequency data link such as a very high frequency (VHF) digital data link. These connections are much more limited in bandwidth as compared to connection 128. Further, the unreliability and error rate using this type of connection also is greater than connection 128. When commercial airplane 126 is at a gate, connection 132 has improved bandwidth and quality.

As depicted, the amount of information that can be transferred between client computer 112 and computer system 130 can vary depending on the location of commercial airplane 126. For example, transferring information to client computer 112 from computer system 130 in commercial airplane 126 takes more time when commercial airplane 126 is in flight as compared to when commercial airplane 126 is at the gate.

This difference in the transfer rates of information is noticeable to client computer 112. The quality of service (QoS) is lower than desired in these situations. As a result, the overall quality of service is not as high as desired even though the quality of service may be good at the gate.

In this illustrative example, operational digital twin 134 is located at server computer 104. As depicted, operational digital twin 134 operates as an intermediary between computer system 130 in commercial airplane 126 and client computer 112 for airline 124. In this example, computer system 130 communicates with operational digital twin 134 at server computer 104 using connection 132. Client computer 112 communicates with operational digital twin 134 at server computer 104 using connection 128.

As depicted, operational digital twin 134 operates to receive information from computer system 130 in commercial airplane 126. This reception of information occurs even when a request for the information is not present. The selection of what information is received from computer system 130 in commercial airplane 126 can be preselected or based on some policy during the operation of commercial airplane 126. For example, information can be selected as fuel use data, engine temperature, outside temperature, thrust, hydraulic pressure, or other data that may be used by airline 124 or some other entity in operating or maintaining commercial airplane 126. This data can be streamed in real-time or as close to real-time as possible through connection 132. Although the streaming of this information uses resources, selecting particular parameters for types of data reduces the amount of information that needs to be streamed or sent in real-time over connection 132.

The transmission of this information from commercial airplane 126 to airline 124 may not meet a desired quality of service desired by airline 124. Additionally, some systems may be unavailable to send information at different times during the operation of commercial airplane 126. In this illustrative example, the information is received by operational digital twin 134 prior to a request for the data. Operational digital twin 134 stores this information. When a request is received from client computer 112 for airline 124, any of the information stored by operational digital twin 134 that is responsive to the request is sent to client computer 112 over connection 136.

Connection 136 is selected or configured to send information with a quality of service desired or expected by airline 124. Connection 136 is at least one of more consistent, has lower error, or has a higher bandwidth than connection 132. As result, information can be sent at a faster rate or with less error to client computer 112 for airline 124. If all of the information requested is not located at operational digital twin 134, that information is requested from computer system 130 by operational digital twin 134. This information is then sent to client computer 112. This portion of the information retrieved from computer system 130 may not have the desired quality of service. However, the overall quality of service is increased using operational digital twin 134 to store information that may be needed ahead of time. In other words, operational digital twin 134 can selectively cache information that may be needed.

Figure 2:
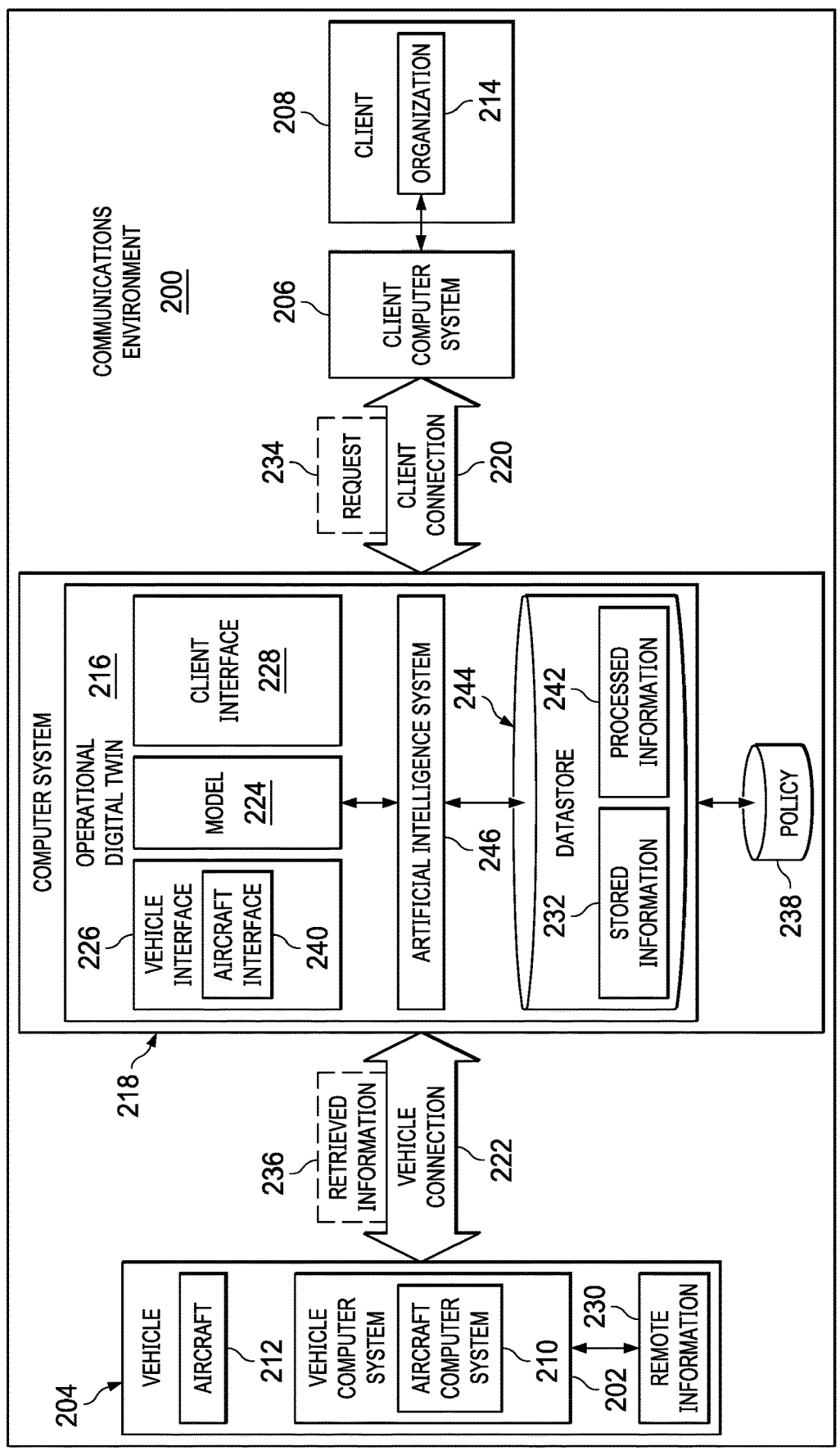
FIG. 2 is an illustration of a block diagram of a communications environment in accordance with an illustrative embodiment.

With reference now to FIG. 2, an illustration of a block diagram of a communications environment is depicted in accordance with an illustrative embodiment. As depicted, network data processing system 100 in FIG. 1 is an example of components that can be implemented in communications environment 200.

In this illustrative example, vehicle computer system 202 in vehicle 204 communicates with client computer system 206 for client 208. Vehicle computer system 202 is, for example, aircraft computer system 210 when vehicle 204 takes the form of aircraft 212. Vehicle 204 and aircraft 212 are physical real world objects. Client 208 can be organization 214 such as an airline, an aircraft manufacturer, a ship manufacturer, a maintenance provider, an air traffic control system, or some other suitable organization.

As depicted, operational digital twin 216 running on computer system 218 is an intermediary that facilitates the transfer of information between the computer systems in vehicle 204 and client 208. As depicted, operational digital twin 216 in computer system 218 form a vehicle communications system.

A computer system is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Further, operation digital twin 216 can be implemented in the cloud. For example, operational digital twin 216 in computer system 218 can be components in a cloud architecture that is accessed by client computer system 206 over the Internet.

In this illustrative example, operational digital twin 216 has client connection 220 to client computer system 206. Operational digital twin 216 has vehicle connection 222 to vehicle computer system 202.

Operational digital twin 216 for vehicle 204 comprises model 224 that models vehicle computer system 202 in vehicle 204. Model 224 can model a portion or all of vehicle computer system 202. For example, when vehicle 204 is aircraft 212, model 224 in operational digital twin 216 models at least one of a flight management system, a navigation system, a communications system, a sensor system, an engine-indicating and crew-alerting system (EICAS), or some other system in aircraft computer system 210.

Additionally, model 224 can model other parts of aircraft 212. For example, model 224 can also include an airframe, hydraulics, environmental systems, or other systems in aircraft 212. In other words, model 224 includes all of the components in aircraft 212 in some illustrative examples.

In this illustrative example, operational digital twin 216 also may include artificial intelligence system 246. Artificial intelligence system 246 is an intelligent system that has a capacity for at least one of logic, awareness, learning, or problem solving. An artificial intelligence system comprises at least one of an artificial neural network, a cognitive system, a Bayesian network, a fuzzy logic system, an expert system, a natural language system, a cognitive system, or some other suitable type of system. Machine learning is used to train a process or artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

Model 224 can be a model accessed by artificial intelligence system 246. In other illustrative examples, model 224 can be part of artificial intelligence system 246.

In one example, operational digital twin 216 includes model 224 and models of other aircraft in a fleet, which can be diverse. Operational digital twin 216 can be used to perform predictive analysis using the data obtained from aircraft in the fleet and the models of the aircraft in the fleet. The predictive analysis performed by operational digital twin 216 can be used to forecast and identify trends that provide insight into preventive maintenance and other services. Further, predictive, descriptive, and decision models can be implemented or derived from these models. The predictive, descriptive, and decision models can be used by operational digital twin 216 to improve vehicle efficiency and availability that also reduce maintenance costs. These models can also be used to enhance the experience of passengers on commercial aircraft. Use of Flight Operations Quality Assurance (FOQA) and other vehicle data can be used by operational digital twin 216 in forecasting to schedule preventive maintenance activities. Thus, safety and vehicle in-service reliability can be improved.

Further, operational digital twin 216 has vehicle interface 226 configured to communicate with vehicle computer system 202 and client interface 228 configured to communicate with client computer system 206. When vehicle 204 is aircraft 212, vehicle interface 226 is aircraft interface 240. As depicted, client computer system 206 is in a location remote to vehicle 204. In other words, operational digital twin 216 is not located in vehicle 204. For example, if vehicle 204 is aircraft 212, client computer system 206 can be, for example, an airline operations center or a maintenance facility located on the ground.

In this illustrative example, operational digital twin 216 stores remote information 230 received from vehicle computer system 202 using vehicle interface 226 to form stored information 232. In this illustrative example, model 224 can include processes needed to store remote information 230. As depicted, remote information 230 can be pulled or pushed from vehicle computer system 202. In the illustrative example, stored information 232 comprises at least one of state information of systems in the vehicle, fuel use data, a command, video data, audio data, internal cabin temperature data, an image, a log, engine data, or other information in or collected by vehicle computer system 202.

As depicted, stored information 232 can be stored in datastore 244 in operational digital twin 216. Datastore 244 can take a number of different forms. For example, datastore 244 can be selected from at least one of a memory, a hard disk drive, a solid-state disk drive, or some other storage device. Datastore 244 can be a portion or all of a storage device. Datastore 244 can be a logical or physical device in different illustrative examples.

Operational digital twin 216 sends stored information 232 that is responsive to request 234 received from client computer system 206 using client interface 228. Operational digital twin 216 retrieves remote information 230 responsive to request 234 but absent from stored information 232 from vehicle computer system 202 using vehicle interface 226 to form retrieved information 236 and sends retrieved information 236 to client computer system 206 using client interface 228. Further, retrieved information 236 can be stored by operational digital twin 216 as part of stored information 232.

In one illustrative example, operational digital twin 216 selectively retrieves remote information 230 responsive to request 234 from client computer system 206 but absent from stored information 232 based on an amount of bandwidth available to transfer remote information 230 to operational digital twin 216. In some examples, remote information 230 responsive to request 234 may not be needed immediately. For example, when vehicle 204 is aircraft 212, the transfer of remote information 230 from aircraft 212 can wait until aircraft 212 is at the gate and has a wired connection with greater bandwidth and reliability.

As depicted, operational digital twin 216 operates to provide network connectivity between the vehicle computer system 202 in vehicle 204 and client computer system 206. This connectivity has an increased quality of service to client computer system 206 as compared to client computer system 206 communicating with vehicle computer system 202 without operational digital twin 216 as an intermediary.

In one illustrative example, operational digital twin 216 establishes communications with vehicle computer system 202 in response to vehicle computer system 202 initiating the communications. By having vehicle computer system 202 establish the communications, increased security for vehicle computer system 202 may be achieved. This feature may be especially useful when vehicle computer system 202 is aircraft computer system 210 in aircraft 212. With this example, aircraft computer system 210 makes requests for connection and does not respond to requests for connections such that aircraft computer system 210 does not need to include processes to handle authenticating or authorizing connections originated by an outside entity.

Further, operational digital twin 216 can process stored information 232 such that the processing of stored information 232 forms processed information 242 that is responsive to request 234. In other words, operational digital twin 216 can perform some processing of information retrieved from vehicle computer system 202. The processing of information is performed by operational digital twin 216 in place of vehicle computer system 202 performing the processing of the information.

As a result, the use of resources in vehicle computer system 202 is reduced. This delegation of processing aids in reducing the load on vehicle computer system 202 by assigning the processing tasks to operational digital twin 216 in computer system 218, which typically has greater and more robust resources for processing information than vehicle computer system 202.

As depicted, stored information 232 may be retained based on policy 238. Policy 238 is a group of rules used to determine the conditions under which stored information 232 can be removed from operational digital twin 216. As used herein, "a group of," when used with reference to items, means one or more items. For example, "a group of rules" is one or more rules.

For example, timestamps can be associated with stored information 232. Operational digital twin 216 can delete a portion of stored information 232 using the timestamps and policy 238. For example, policy 238 may specify that stored information 232 is to be removed after some selected period of time or when an amount of available storage is reduced below a threshold. Additionally, policy 238 also may identify which types of information are removed or retained in operational digital twin 216.

Operational digital twin 216 may be implemented in software, hardware, firmware, or a combination thereof. When software is used, the operations performed by operational digital twin 216 may be implemented in program code configured to run on hardware, such as a processor unit. When firmware is used, the operations performed by operational digital twin 216 may be implemented in program code and data and stored in persistent memory to run on a processor unit. When hardware is employed, the hardware may include circuits that operate to perform the operations in operational digital twin 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with transferring information from a vehicle to a client computer system with a desired quality of service. As a result, one or more technical solutions may provide a technical effect of employing an operational digital twin that facilitates the communications between an aircraft computer system and a client computer system. In one or more technical solutions, an operational digital twin receives and stores information from the vehicle. This information can be used to respond to requests from the client computer system.

As a result, the time for requesting and receiving information from the vehicle computer system is avoided by using the information stored by the operational digital twin. Thus, the response can appear to have real-time characteristics for the client computer system even though responding with real-time characteristics is impossible with the connection to the vehicle computer system.

If additional information is needed to respond to the request and the additional information is absent from the operational digital twin, the additional information can be requested from the vehicle computer system. Although obtaining the additional information may occur at a slower rate or take more time, the overall response is improved as compared to obtaining all of the information responsive to the request from the vehicle computer system using a less-than-optimal connection such as a wireless connection while the vehicle is operating.

Further, the operational digital twin can perform preprocessing and other operations that reduce the need for resource use in the vehicle computer system. Further, the operational digital twin can operate as a history. The history can include at least one of engine parameters, surface control settings, flight paths, locations, maintenance logs, or other suitable information over time.

Additionally, the history may include connectivity. For example, a connectivity history can identify history of connection type, bandwidth rate and availability, packet loss rate, error rates, or other parameters for connectivity. This connectivity history can identify at least one of locations or time. With a connectivity history, routes can be planned to increase reliable connectivity to satellite communications (SATCOM), ground communications, or other types of connectivity. The rest can be selected to provide a better user-experience for crewmembers, passengers, or the people on a flight.

As another example, the history also may include a fleet history. An operational digital twin can be present for each aircraft fleet to model the aircraft in the fleet. The outputs of different systems in the fleet can be received by the operational digital twin. The outputs of the different systems for each aircraft in the fleet are observed, tracked, correlated, compared, and flagged for anomalies. Further, the operational digital twin for different aircraft in the fleet may have similar systems, allowing correlations across corresponding systems.

Additionally, at least one of software parts or configuration changes can be sent to operational digital twin 216 for aircraft computer system 210 in aircraft 212 in advance of when installation of these components is needed. When connected to aircraft computer system 210 in aircraft 212, at least one of the new software or configuration changes can be pushed from operational digital twin 216 to aircraft computer system 210 in aircraft 212. This process can be used by operational digital twin 216 to improve planning and gate turnaround times. As a result, operational digital twins can push changes to a fleet of aircraft and update the fleet of aircraft seamlessly when desired connections such as those at gates are available.

As a result, computer system 218 operates as a special purpose computer system in which operational digital twin 216 in computer system 218 enables providing information to client computer system 206 more quickly as compared to current techniques. In particular, operational digital twin 216 transforms computer system 218 into a special purpose computer system as compared to currently available general computer systems that do not have operational digital twin 216. Further, with operational digital twin 216 in computer system 218, a network data processing system that includes vehicle computer system 202, such as aircraft computer system 210 in aircraft 212, can operate more efficiently in sending information to client computer system 206 with a higher quality of service as compared to current techniques for obtaining information from aircraft 212 and sending the information to a client computer system 206.

The illustration of communications environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more operational digital twins may be present in addition to operational digital twin 216. In the illustrative examples, an operational digital twin can be present for each aircraft. In other illustrative examples, operational digital twin 216 can have a plurality of models in addition to or in place of model 224 in stored information for multiple aircraft. For example, one or more operational digital twins can be used to provide an airline access to its fleet of aircraft. The access can be used to perform scheduling of maintenance as well as monitoring various performance and cost-related parameters.

As another example, one implementation of vehicle 204 described in FIG. 2 is aircraft 212. Vehicle 204 can take other forms. For example, vehicle 204 can be selected from a group comprising a mobile platform, a rotorcraft, an airplane, a surface ship, a tank, a personnel carrier, a train, a spacecraft, a submarine, a bus, an automobile, and other suitable types of vehicles.

Further, operational digital twin 216 can also not only obtain information from vehicle computer system, but also send commands bi-directionally and run simulation tools on different vehicle systems. Additionally, operational digital twin 216 also allows opportunities to augment functionality by only adding services using application programming interfaces and data feeds. For example, support can be added for different types of sensors and protocols accomplishable by simply making changes to the access application programming interfaces. This access can be achieved by modifying the vehicle computer system or the client computer system.

As another example, when an operational digital twin models an aircraft, the operational digital twin with the model of the aircraft is unique and has at least one of a set of attributes, policies, technical controls, data retention rules, data, links to data, a state model, or other information. The operational digital twin can easily be reassigned from one airline to another, if desired. Furthermore, the operational digital twin for an aircraft persists even if the aircraft is retired. Further, operational digital twins are versioned and need not have identical versioning. An operational digital twin will hold the state of the aircraft. This state can include at least one of location, health, or other information about the aircraft.

If an aircraft disconnects from the network and then reappears with modified attributes, the operational digital twin for the aircraft structure adapts, automatically exposing new interfaces to the user. These modified attributes can include modification, repairs, changes in configuration, or other attributes.

Figure 3:
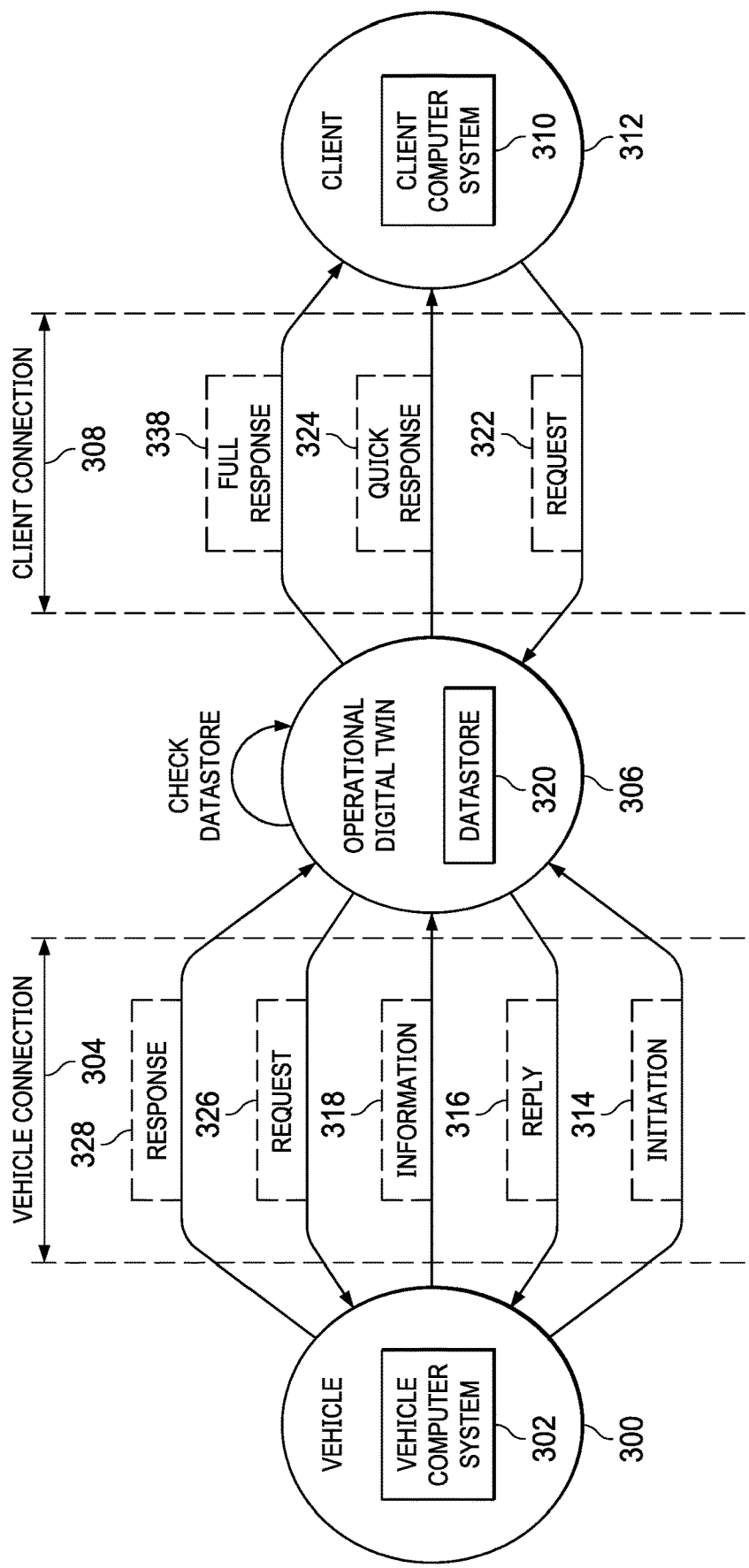
FIG. 3 is an illustration of a dataflow diagram for sending information from a vehicle to a client in accordance with an illustrative embodiment.

With reference now to FIG. 3, an illustration of a dataflow diagram for sending information from a vehicle to a client is depicted in accordance with an illustrative embodiment. In this illustrative example, vehicle 300 includes vehicle computer system 302 in vehicle 300 which has vehicle connection 304 to operational digital twin 306. Operational digital twin 306 has client connection 308 to client computer system 310 in client 312.

In this illustrative example, the data flow begins with vehicle 300 sending initiation 314 to operational digital twin 306. Initiation 314 is a request made by vehicle computer system 302 to initiate vehicle connection 304 between vehicle 300 and operational digital twin 306.

In response to receiving initiation 314, operational digital twin 306 returns reply 316 to vehicle 300. Reply 316 confirms the establishment of vehicle connection 304 between vehicle 300 and operational digital twin 306.

With the establishment of vehicle connection 304, vehicle 300 sends information 318 to operational digital twin 306. Information 318 may take a number of forms. In this example, information 318 includes a portion of a video clip. The sending of information 318 may occur over some period of time using vehicle connection 304. The amount of time depends on at least one of an amount of bandwidth available, reliability, latency, loss, jitter, and other factors in vehicle connection 304.

In this illustrative example, information 318 received by operational digital twin 306 is stored in datastore 320 in operational digital twin 306.

As depicted, client 312 sends request 322 for the video clip. Responsive to receiving request 322, operational digital twin 306 checks datastore 320 and sends quick response 324. Quick response 324 includes any portion of the video clip received in information 318 that is responsive to request 322. For example, if half of the video clip has been received in information 318 and is stored in datastore 320 in operational digital twin 306, that portion of the video clip is returned in quick response 324. As a result, quick response 324 provides an appearance of real-time responsiveness with respect to vehicle 300.

In this illustrative example, operational digital twin 306 sends request 326 to vehicle 300 for the remaining portion of video clip. In response, vehicle 300 sends response 328 with the remaining portion of the video clip. Operational digital twin 306 sends full response 338 to client 312. Full response 338 contains the remaining portion of the video clip in this example. As depicted, full response 338 is aggregated with quick response 324 to complete the video clip requested by client 312. Although full response 338 may not have real-time characteristics, the overall quality of service is increased as compared to currently used techniques that do not use operational digital twin 306. If the entire video clip is present in datastore 320, only quick response 324 is made and request 326 is unnecessary. In this example, the entire video clip is sent using a user connection.

Thus, one or more illustrative example provides a flexible architecture for the communication and computation between a fleet of vehicles, such as airplanes, and client computer systems. The architecture is sufficiently robust to dynamically handle different information types, such as real-time sensors, data streaming, file downloads, commands, and other computational functions, which can be incrementally added seamlessly into the operational end-to-end system between the vehicle and the client.

In the illustrative example, the end-to-end computation and communication framework comprises into two segments: vehicle-to-operational digital twin interaction and the operational digital twin-to-client. Therefore, all the vehicles only interact with their operational digital twin and the clients only interact with the operational digital twin. This framework also permits quick response times to clients by providing data updates automatically to vehicle computer systems and the client computer systems even with network constraints or after periods of network disruptions.

Furthermore, adding support for different types of sensors and protocols is accomplishable by simply making changes to application programming interfaces (APIs) in the operational digital twin and data feeds without the need of modifying the vehicle computer system or the client computer system. However, these changes can be performed at either the vehicle computer system platform end or the client computer system without impacting the other. As depicted, the communication of information is performed automatically without user intervention by dynamically performing the information exchange in real-time as much as possible to provide the appropriate adaptation that ensures seamless end-to-end interaction.

Figure 4:
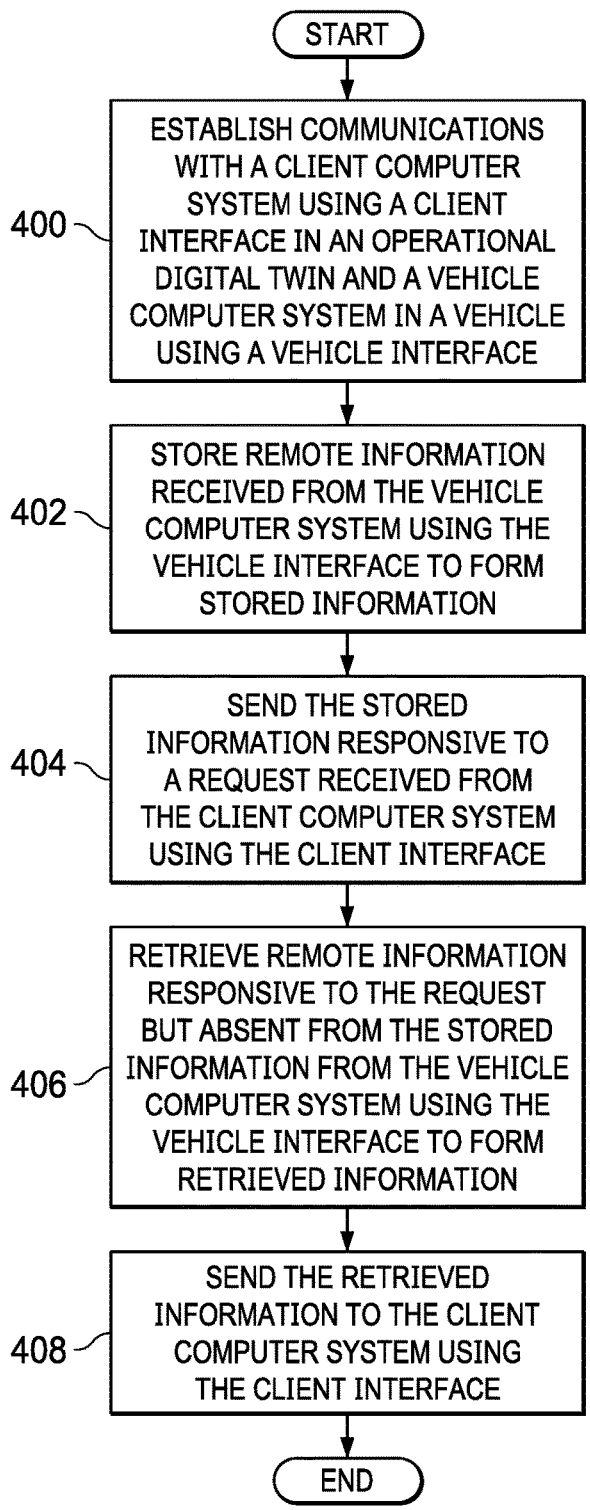
FIG. 4 is an illustration of a flowchart of a process for facilitating communications between a client computer system and a vehicle computer system in accordance with an illustrative embodiment.

Turning next to FIG. 4, an illustration of a flowchart of a process for facilitating communications between a client computer system and a vehicle computer system is depicted in accordance with an illustrative embodiment. The process in FIG. 4 can be implemented in hardware, software, or both.

When implemented in software, the process can take the form of program code that is run by one or more processor units located in one or more hardware devices in one or more computer systems. For example, the process can be implemented in operational digital twin 216 running on computer system 218 in FIG. 2.

The process begins by establishing communications with a client computer system using a client interface in an operational digital twin and a vehicle computer system in a vehicle using a vehicle interface (operation 400). In this example, the operational digital twin includes a model of the vehicle computer system. The process stores remote information received from the vehicle computer system using the vehicle interface to form stored information (operation 402).

The process sends the stored information responsive to a request received from the client computer system using the client interface (operation 404). The process retrieves remote information responsive to the request but absent from the stored information from the vehicle computer system using the vehicle interface to form retrieved information (operation 406).

The process sends the retrieved information to the client computer system using the client interface (operation 408). The process terminates thereafter. The operational digital twin operates to provide network connectivity between the vehicle computer system in the vehicle and the client computer system with an increased quality of service to the client computer system.

Figure 5:
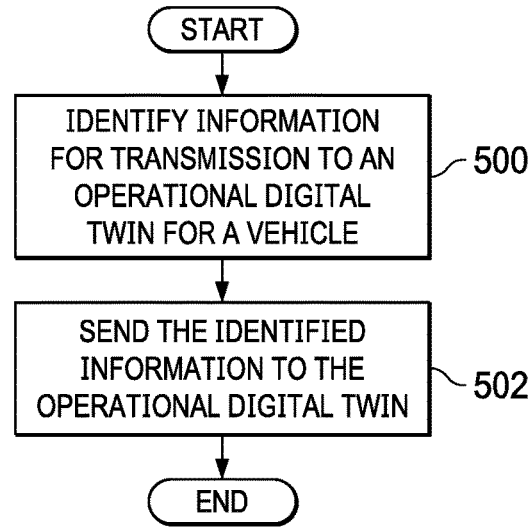
FIG. 5 is an illustration of a flowchart of a process for sending information to an operational digital twin in accordance with an illustrative embodiment.

With reference now to FIG. 5, an illustration of a flowchart of a process for sending information to an operational digital twin is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in vehicle computer system 202 running on vehicle 204 in FIG. 2.

The process in FIG. 5 can be implemented to send information to the operational digital twin for storage. In the illustrative example, this process is not initiated by a request from the operational digital twin.

The process begins by identifying information for transmission to an operational digital twin for a vehicle (operation 500). The information can be identified from a configuration file, a list, a database, or some other data structure. The information can include at least one of a maintenance log, a fuel log, real-time fuel consumption, video data, audio data, an image, engine data, or other suitable types of information. This information can be preselected by the client such as an airline or maintenance provider. In other illustrative examples, the information can be selected based on a prior request for the information from the vehicle.

The process sends the identified information to the operational digital twin (operation 502). The process terminates thereafter. This information can be sent in a number of different ways. For example, information can be streamed, sent periodically, or some other manner. In the case of an aircraft, the information can be transferred when the aircraft is at the gate and has a wired connection.

Figure 6:
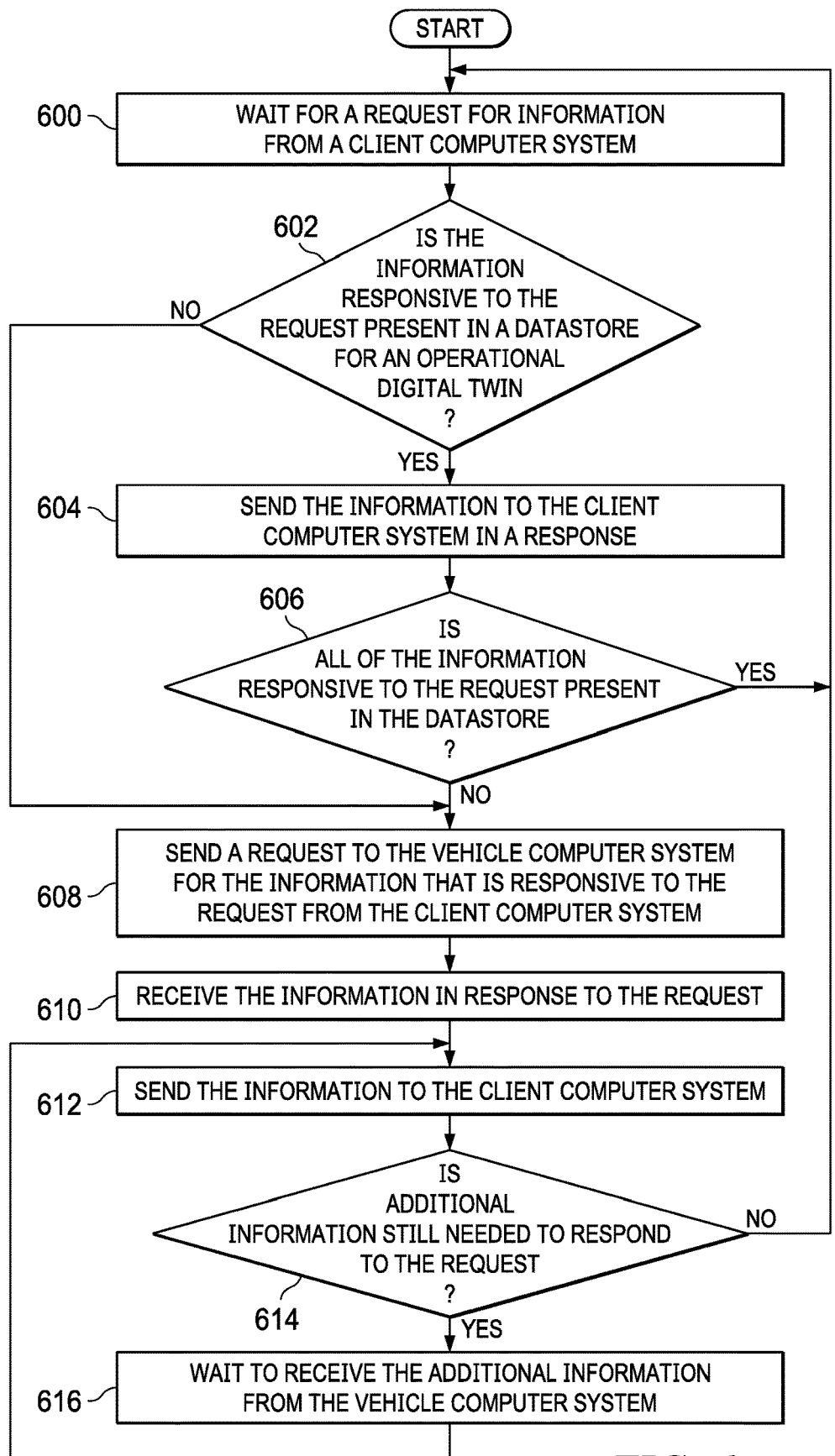
FIG. 6 is an illustration of a flowchart of a process for facilitating communication between a vehicle and a client using an operational digital twin in accordance with an illustrative embodiment.

With reference now to FIG. 6, an illustration of a flowchart of a process for facilitating communication between a vehicle and a client using an operational digital twin is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in operational digital twin 216 running on computer system 218 in FIG. 2.

The process begins by waiting for a request for information from a client computer system (operation 600). When the request is received, a determination is made as to whether the information responsive to the request is present in a datastore for an operational digital twin (operation 602). The datastore can be a separate component that is accessed by the operational digital twin. In another example, the datastore can be a part of the operational digital twin.

If the information responsive to the request is present in the datastore, the information is sent to the client computer system in a response (operation 604). A determination is made as to whether all of the information responsive to the request is present in the datastore (operation 606).

If the information responsive to the request is missing from the datastore, the process sends a request to the vehicle computer system for the information that is responsive to the request from the client computer system (operation 608).

The process receives the information in response to the request (operation 610). The process then sends the information to the client computer system (operation 612). A determination is made as to whether additional information is still needed to respond to the request (operation 614). If additional information is needed, the process waits to receive the additional information from the vehicle computer system (operation 616). When the information is received, the process returns to operation 612.

With reference again to operation 614, if the additional information is not needed, the process then returns to operation 600. With reference again to operation 602, if the information responsive to the request is not present in the datastore, the process proceeds to operation 608.

With reference again to step 606, if all of the information responsive to the request is present in the datastore, the process returns to step 600.

Figure 7:
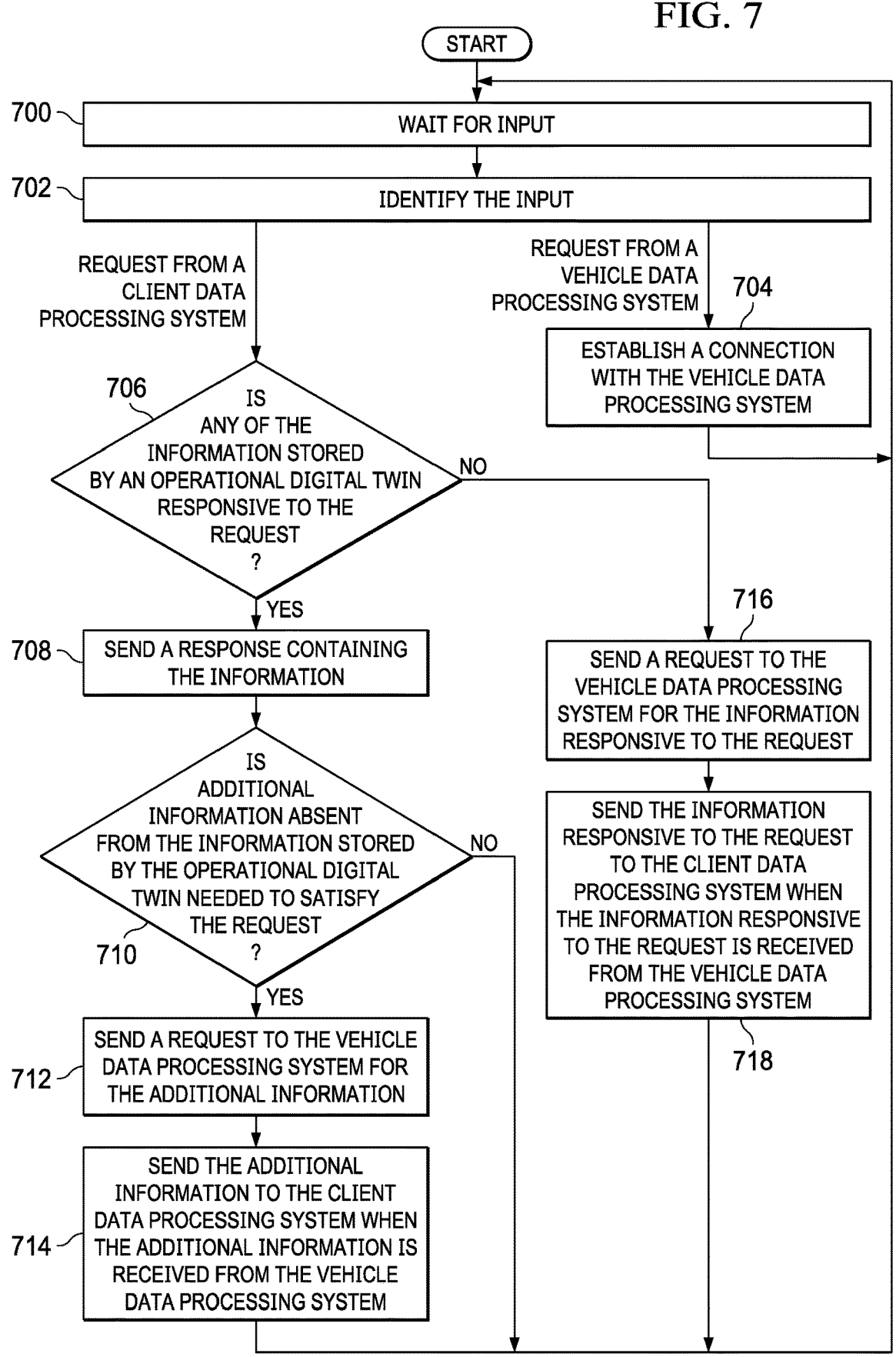
FIG. 7 is an illustration of a flowchart of a process for facilitating communications between a vehicle and a client in accordance with an illustrative embodiment.

Turning next to FIG. 7, an illustration of a flowchart of a process for facilitating communications between a vehicle and a client is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in operational digital twin 216 running on computer system 218 in FIG. 2.

The process begins by waiting for input (operation 700). This input can be received from a vehicle data processing system or a client data processing system.

When the input is received, the process identifies the input (operation 702). If the input is a request from a vehicle data processing system to initiate a connection, the process establishes a connection with the vehicle data processing system (operation 704). Having the vehicle establish the connection increases security. With this example, the vehicle does not accept connection requests from at least one of an operational digital twin or other requesters. The process then returns to operation 700.

With reference again to step 702, if the input is a request for information received from a client data processing system, the process determines whether any of the information stored by an operational digital twin is responsive to the request (operation 706). If the information responsive to the request is present, the process sends a response containing the information (operation 708). This response may be considered a quick response because the information is sent from the operational digital twin and does not need to rely on obtaining the information from the vehicle computer system.

A determination is made as to whether additional information absent from the information stored by the operational digital twin is needed to satisfy the request (operation 710). If the additional information is needed, the process sends a request to the vehicle data processing system for the additional information (operation 712). The process sends the additional information to the client data processing system when the additional information is received from the vehicle data processing system (operation 714). The process then returns to operation 700.

With reference again to operation 710, if the additional information is not needed to satisfy the request, the process returns to operation 700. With reference again to operation 706, if the information responsive to the request is not present, the process sends a request to the vehicle data processing system for the information responsive to the request (operation 716). The process sends the information responsive to the request to the client data processing system when the information responsive to the request is received from the vehicle data processing system (operation 718). The process then returns to operation 700.

In this manner, the information that is stored by the operational digital twin can be used to satisfy the request more quickly than the client data processing system sending the request directly to the vehicle data processing system. In this manner, the quality of service in returning the information to the client data processing system is increased as compared to currently used mechanisms.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
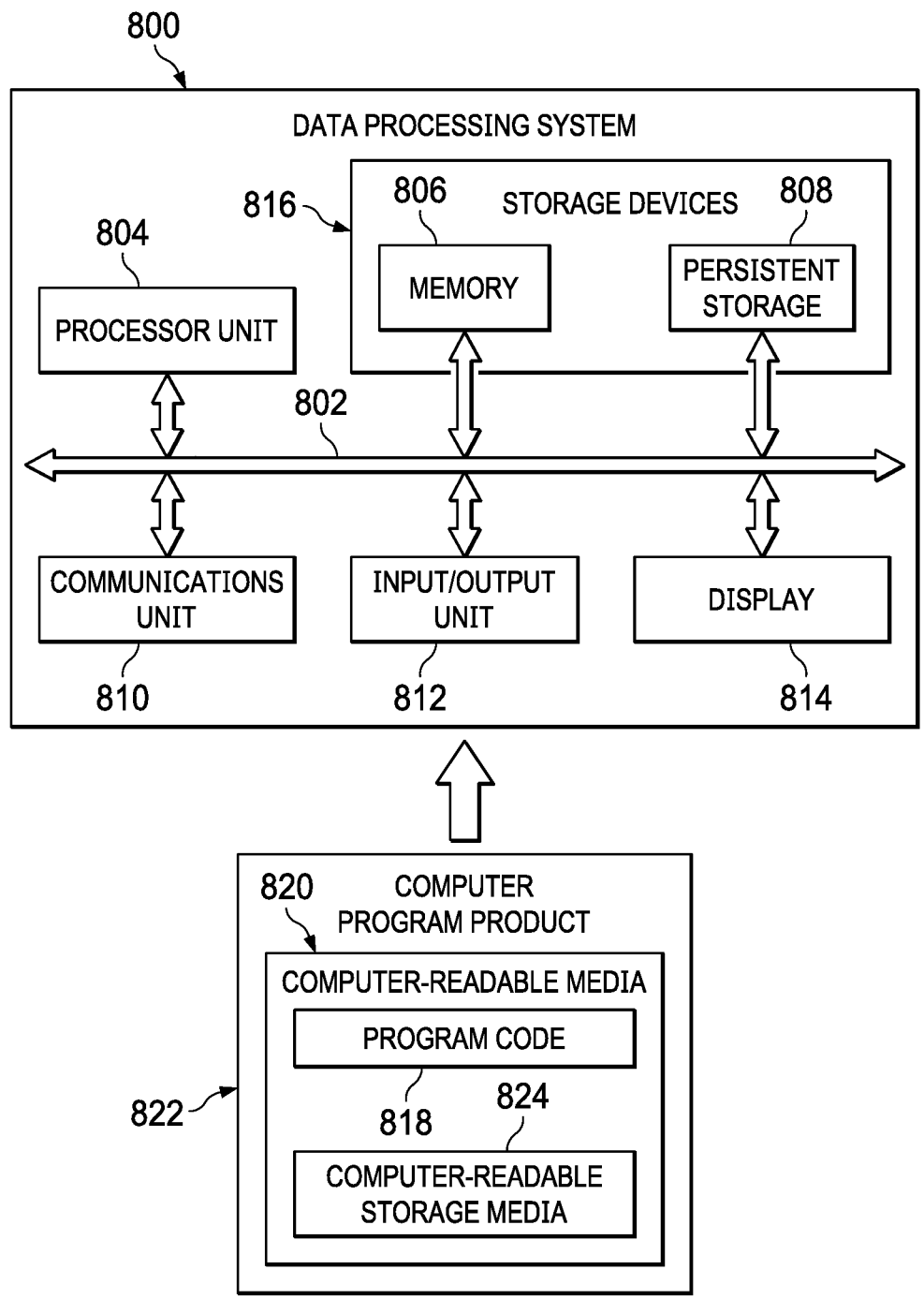
FIG. 8 is an illustration of a block diagram of a data processing system in accordance with an illustrative embodiment.

Turning now to FIG. 8, an illustration of a block diagram of a data processing system is depicted in accordance with an illustrative embodiment. server computer 104, server computer 106, client devices 110, in FIG. 1. Data processing system 800 can also be used to implement vehicle computer system 202, client computer system 206, aircraft computer system 210, and computer system 218 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid-state drive (SSD), a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 may be transferred to data processing system 800 using a computer-readable signal media. The computer-readable signal media may be, for example, a propagated data signal containing program code 818. For example, the computer-readable signal media may be at least one of an electromagnetic signal, an optical signal, or any other suitable type of signal. These signals may be transmitted over at least one of connections, such as wireless connections, optical fiber cable, coaxial cable, a wire, or any other suitable type of connection.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative examples provide a method, apparatus, and system facilitating communication between a client computer system and a vehicle computer system. In the illustrative examples, an operational digital twin operates as a mediating object that represents the operational vehicle computer system, such as an airplane computer system. Additionally, the operational digital twin represents a client computer system and facilitates the interaction between these computer systems. Client computer system interaction occurs with the operational digital twin, which interacts with aircraft computer system in the aircraft.

With one or more illustrative examples, the interaction with the operational digital twin appears to have real-time response characteristics even though a large delay is present between the aircraft computer system in the aircraft and terrestrial networks. For example, network disruptions can occur where the aircraft computer system loses connectivity or the connections have increased error rates, jitter, packet loss, or undesired attributes.

In the illustrative examples, the operational digital twin provides the client computer system with access to as much information from the aircraft computer system as possible. By resolving the computational and communication differences between the aircraft computer system and the plot computer system in an efficient manner, the compartmentalization between the aircraft computer system and the operational digital twin for the aircraft computer system helps maximize the quality of service performance measures of the two segments, aircraft computer system to the operational digital twin and the operational digital twin to the client computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft communications system for communicating with an aircraft, wherein the aircraft communications system comprises:
    a computer system; and
    an operational digital twin for the aircraft,
    wherein the operational digital twin runs on the computer system and models an aircraft computer system in the aircraft in which the operational digital twin has an aircraft interface configured to communicate with the aircraft computer system and a client interface configured to communicate with a client computer system in a location remote to the aircraft,
    wherein the operational digital twin
        establishes communications with the aircraft computer system in response to the aircraft computer system initiating the communications;
        stores remote information received from the aircraft computer system using the aircraft interface to form stored information;
        receives a request from the client computer system using the client interface; and
        responsive to receipt of the request, the operational digital twin
            sends a first response to the client computer system, wherein the first response comprises the stored information;
            retrieves additional information from the aircraft computer system using the aircraft interface; and
            sends a second response to the client computer system using the client interface, wherein the second response comprises the additional information,
    wherein the operational digital twin operates to provide network connectivity between the aircraft computer system in the aircraft and the client computer system with an increased quality of service to the client computer system.

2. A vehicle communications system for communicating with a vehicle, wherein the vehicle communications system comprises:
    a computer system; and
    an operational digital twin for the vehicle,
    wherein the operational digital twin runs on the computer system and models a vehicle computer system in the vehicle in which the operational digital twin has a vehicle interface configured to communicate with the vehicle computer system and a client interface configured to communicate with a client computer system in a location remote to the vehicle,
    wherein the operational digital twin
        stores remote information received from the vehicle computer system using the vehicle interface to form stored information;
        receives a request from the client computer system using the client interface; and responsive to receipt of the request, the operational digital twin
sends a first response to the client computer system using the client interface, wherein the first response comprises the stored information;
retrieves additional information from the vehicle computer system using the vehicle interface; and
sends a second response to the client computer system using the client interface, wherein the second response comprises the additional information,
wherein the operational digital twin operates to provide network connectivity between the vehicle computer system in the vehicle and the client computer system with an increased quality of service to the client computer system.

3. The vehicle communications system of claim 2, wherein the additional information is stored by the operational digital twin as part of the stored information.

4. The vehicle communications system of claim 2, wherein timestamps are associated with the stored information and the operational digital twin purges a portion of the stored information using the timestamps and a policy.

5. The vehicle communications system of claim 2, wherein the operational digital twin selectively retrieves the additional information based on an amount of bandwidth available to transfer information to the operational digital twin.

6. The vehicle communications system of claim 2, wherein the stored information is processed by the operational digital twin to form processed information that is responsive to the request.

7. The vehicle communications system of claim 2, wherein the operational digital twin establishes communications with the vehicle computer system in response to the vehicle computer system initiating the communications.

8. The vehicle communications system of claim 2, wherein the stored information comprises at least one of state information of systems in the vehicle, fuel use data, a command, video data, audio data, internal cabin temperature data, an image, a log, or engine data.

9. The vehicle communications system of claim 2, wherein the operational digital twin models at least one of a flight management system, a navigation system, a communications system, a sensor system, and an engine-indicating and crew-alerting system (EICAS) in the vehicle computer system.

10. The vehicle communications system of claim 2, wherein the client computer system is for an organization selected from a group comprising an airline, an aircraft manufacturer, a ship manufacturer, maintenance provider, and an air traffic control system.

11. The vehicle communications system of claim 2, wherein the vehicle is selected from a group comprising a mobile platform, an aircraft, a rotorcraft, an airplane, a surface ship, a tank, a personnel carrier, a train, a spacecraft, a submarine, a bus, and an automobile.

12. A method for facilitating communications between a client computer system and a vehicle computer system in a vehicle, the method comprising:
establishing, by an operational digital twin running on a computer system, communications with the client computer system using a client interface in the operational digital twin and the vehicle computer system in the vehicle using a vehicle interface, wherein the operational digital twin includes a model of the vehicle computer system;
storing, by the operational digital twin running on the computer system, remote information received from the vehicle computer system using the vehicle interface to form stored information;
receiving, by the operational digital twin, a request from the client computer system using the client interface; and
sending by the operational digital twin, responsive to receipt of the request, a first response to the client computer system using the client interface, wherein the first response comprises the stored information;
retrieving, by the operational digital twin running on the computer system, responsive to receipt of the request, additional information from the vehicle computer system using the vehicle interface; and
sending, by the operational digital twin running on the computer system, responsive to receipt of the request, a second response to the client computer system using the client interface, wherein the second response comprises the additional information
wherein the operational digital twin operates to provide network connectivity between the vehicle computer system in the vehicle and the client computer system with an increased quality of service to the client computer system.

13. The method of claim 12, wherein the additional information is stored by the operational digital twin as part of the stored information.

14. The method of claim 12, wherein timestamps are associated with the stored information and further comprising:
purging, by the operational digital twin running on the computer system, a portion of the stored information using the timestamps and a policy.

15. The method of claim 12, wherein retrieving additional information comprises:
selectively retrieving the additional information based on an amount of bandwidth available to transfer information to the operational digital twin.

16. The method of claim 12 further comprising:
processing, by the operational digital twin running on the computer system, the stored information to form processed information that is responsive to the request.

17. The method of claim 12, wherein establishing, by the operational digital twin running on the computer system, communications with the vehicle computer system in the vehicle using the vehicle interface is in response to the vehicle computer system initiating the communications.

18. The method of claim 12, wherein the stored information comprises at least one of state information of systems in the vehicle, fuel use data, a command, video data, audio data, an image, a log, or engine data.

19. The method of claim 12, wherein the operational digital twin models at least one of a flight management system, a navigation system, a communications system, a sensor system, and an engine-indicating and crew-alerting system (EICAS) in the vehicle computer system.

20. The method of claim 12, wherein the client computer system is for an organization selected from a group comprising an airline, an aircraft manufacturer, a ship manufacturer, a maintenance provider, and an air traffic control system.

* * * * *